United States Patent
Chiu et al.

(10) Patent No.: US 9,423,557 B2
(45) Date of Patent: Aug. 23, 2016

(54) BACKLIGHT COMPONENT

(71) Applicant: Wistron Corporation, New Taipei (TW)

(72) Inventors: Yu-Wei Chiu, New Taipei (TW);
Wen-Lin Wu, New Taipei (TW);
Sheng-Liang Cheng, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 84 days.

(21) Appl. No.: 14/475,703

(22) Filed: Sep. 3, 2014

(65) Prior Publication Data

US 2015/0362664 A1  Dec. 17, 2015

(30) Foreign Application Priority Data

Jun. 11, 2014  (TW) .............................. 103210296 U (51) Int. Cl.
*F21V 7/04* (2006.01)
*F21V 8/00* (2006.01)

(52) U.S. Cl.
CPC ............ *G02B 6/0088* (2013.01); *G02B 6/0065* (2013.01); *G02B 6/0085* (2013.01)

(58) Field of Classification Search
CPC ... G02B 6/0088; G02B 6/0085; G02B 6/0065
USPC ......................................... 362/615, 632–634
See application file for complete search history.

(56) References Cited

U.S. PATENT DOCUMENTS

| | | | | |
|---|---|---|---|---|
| 2011/0149596 A1* | 6/2011 | Lv | ......................... | G02B 6/0073 362/607 |
| 2013/0100372 A1* | 4/2013 | Wu | ....................... | G02B 6/0088 349/58 |
| 2014/0063855 A1* | 3/2014 | Yang | ..................... | F21V 29/004 362/632 |

* cited by examiner

*Primary Examiner* — Andrew Coughlin
*Assistant Examiner* — Meghan Ulanday
(74) *Attorney, Agent, or Firm* — McClure, Qualey & Rodack, LLP (57) ABSTRACT

A backlight component includes a back plate, a fastening module, a light source and a light-guiding plate. The fastening module includes a first plate, a second plate and a third plate. The first plate, the second plate and the third plate define a receiving space. The light source is securely assembled at one side of the second plate and facing toward the receiving space. The light-guiding plate is slidably assembled in the receiving space of the fastening module, and sandwiched between the first plate and the third plate. Accordingly, when the thickness of the light-guiding plate is changed, only the second plate of the fastening module need be changed; additionally, the length of the fastening module can be normalized to apply for display devices with different sizes. Consequently, the manufacturing cost of display devices can be reduced, and the fastening module is applicable to different kinds of display devices.

7 Claims, 10 Drawing Sheets

BACKLIGHT COMPONENT

CROSS-REFERENCES TO RELATED APPLICATIONS

This non-provisional application claims priority under 35 U.S.C. §119(a) on Patent Application No. 103210296 filed in Taiwan, R.O.C. on 2014 Jun. 11, the entire contents of which are hereby incorporated by reference.

BACKGROUND

1. Technical Field

The disclosure relates to a backlight component, and particularly to a backlight component applicable for side-light display and provided for fixing the light-guiding plate.

2. Related Art

As technological innovation has continued to progress, thin displays have become popular among different kinds of displays. Sizes of the screens of electronic devices, such as cell phones, computers and televisions, are manufactured to be bigger and bigger, while the overall thicknesses of the screens are manufactured to be thinner and thinner. Many kinds of backlight components for thin display are available; for example, side-light backlight component is a popular design. In the side-light back light module, light emitting elements, such as light emitting diodes (LED) are disposed at the sides of the screen, and the light is distributed over the whole screen through the light-guiding plate.

With the requirements of manufacturing large-sized screens, high-wattage and high-luminescent LEDs must be applied, so that the light is distributed over the whole light-guiding plate. However, after long-term illumination by the high-wattage and high-luminescent LEDs, the light-guiding plate is deformed and bent easily, due to heat from the LEDs. Additionally, with the requirements of manufacturing large and thin display, the contact areas between the light-guiding plate and the LEDs are increased in comparison with a small-sized display, and the thickness of the light-guiding plate is reduced. Consequently, the deformation issue referred to previously occurs much more readily; additionally, the periphery of the light-guiding plate can be deformed to form a wave-like profile, resulting in the inhomogeneity of the light causing problems of light-leak at the periphery of the screen.

Additionally, the size of the conventional fastening structure matches that of a corresponding screen; that is, every time a new-sized screen is manufactured, a new fastening structure must be developed to match with the screen, resulting in a waste of money, time, and materials when manufacturing the molding.

SUMMARY

In view of this, the disclosure provides a backlight component including a back plate, at least one fastening module, a light source and a light-guiding plate. The fastening module is assembled to the back plate and includes a first plate, a second plate and a third plate. The second plate is perpendicularly connected to the first plate, and the third plate is perpendicularly connected to the second plate and parallel to the first plate. The first plate, the second plate and the third plate define a receiving space, and the light source is securely assembled at one side of the second plate and facing toward the receiving space. The light-guiding plate is slidably assembled in the receiving space of the at least one fastening module, and sandwiched between the first plate and the third plate.

Based on the above, the light-guiding plate can be secured by using the fastening module only; the fastening module is integrally formed as a whole thus being in convenience of manufacturing. Additionally, when the thickness of the light-guiding plate is changed, only the second plate of the fastening module needs be changed. Furthermore, in some instances, only the protruding extent of the protruding portions is adjusted, so that the protruding portions are pressed on the light-guiding plate, so the light-guiding plate is sandwiched securely between the first plate and the third plate. Additionally, when the size of the screen is altered, the same fastening module is applicable, or a plurality of fastening modules is applicable. Consequently, the manufacturing cost of the display device can be reduced, and the fastening module of the disclosure is applicable to different kinds of display devices.

The detailed features and advantages of the disclosure are described below in great detail through the following embodiments, the content of which is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
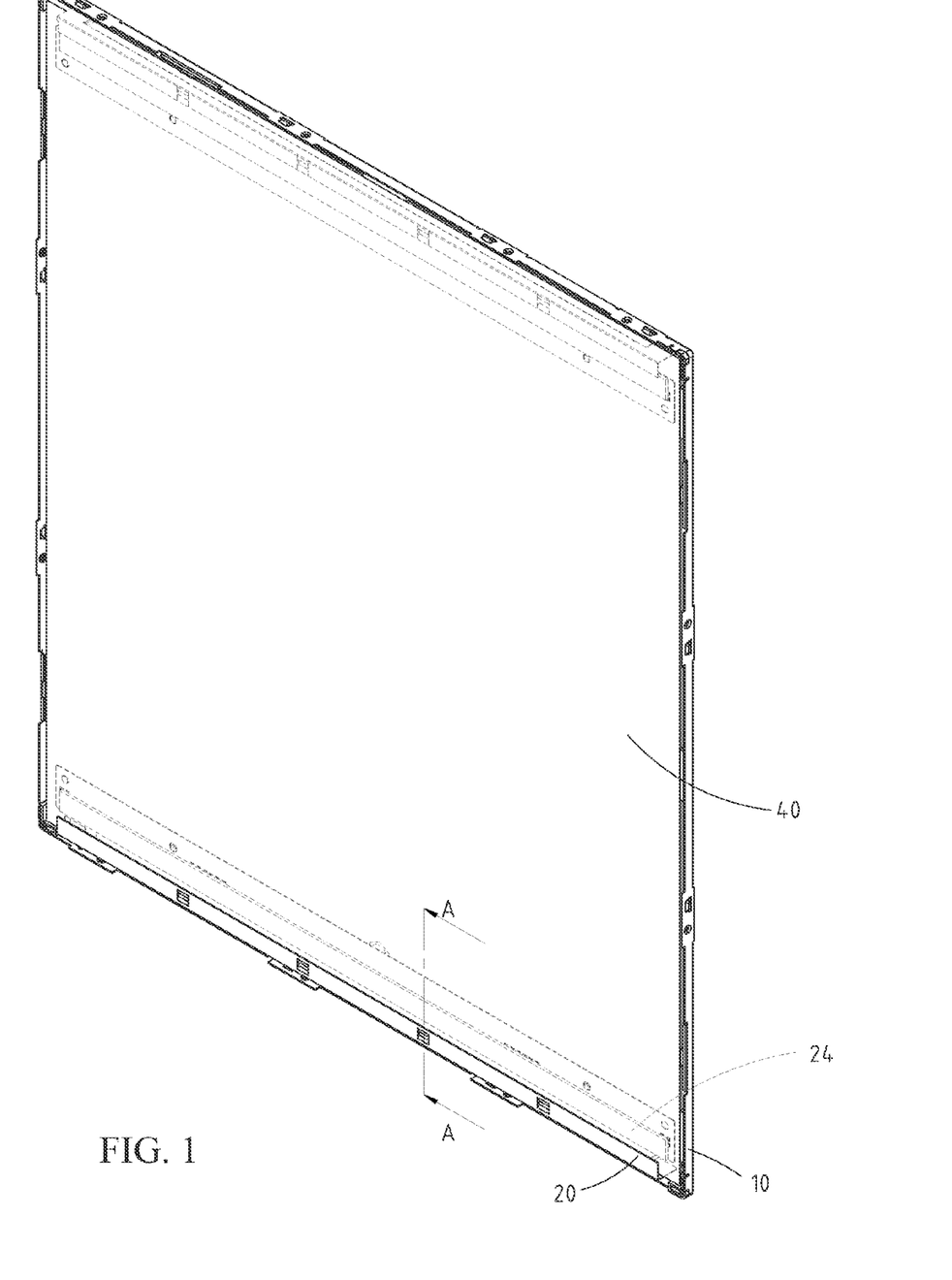
FIG. 1 is a perspective view of a backlight component of a first embodiment according to the disclosure.
Figure 2:
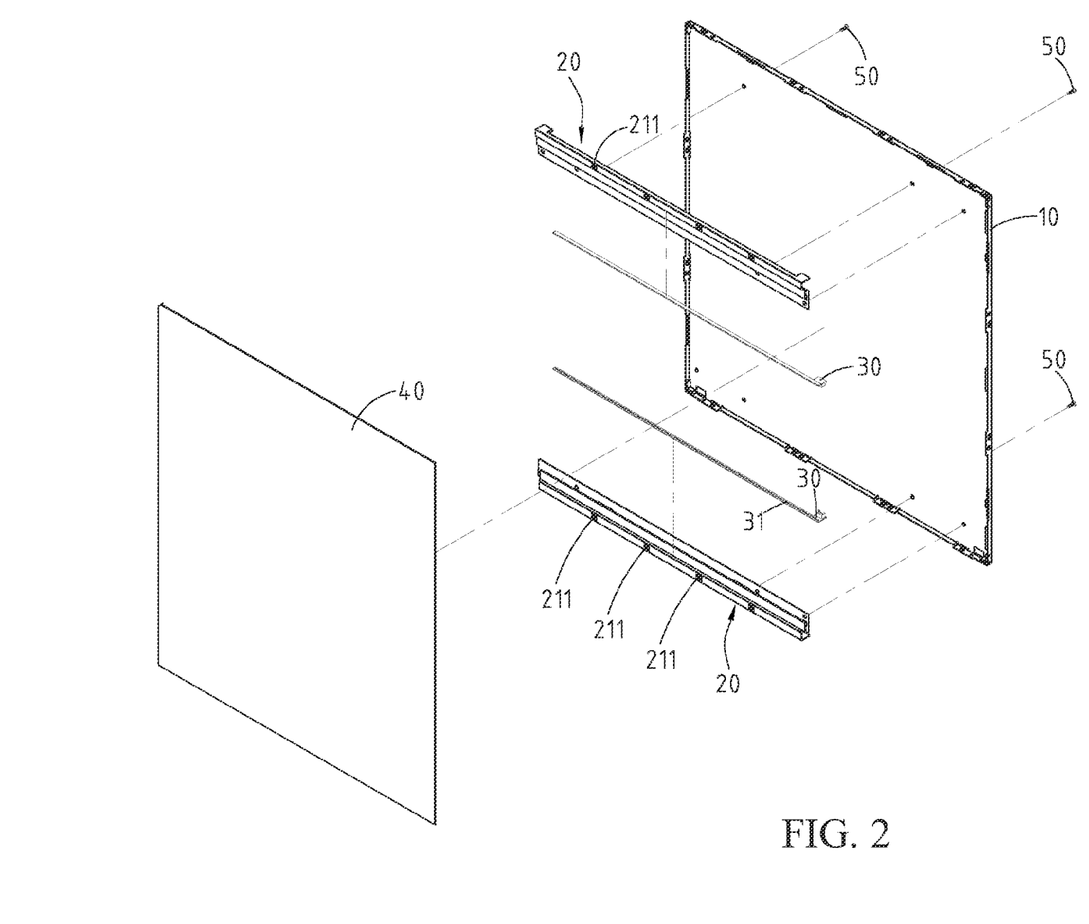
FIG. 2 is an exploded view of the backlight component of the first embodiment according to the disclosure.
Figure 3:
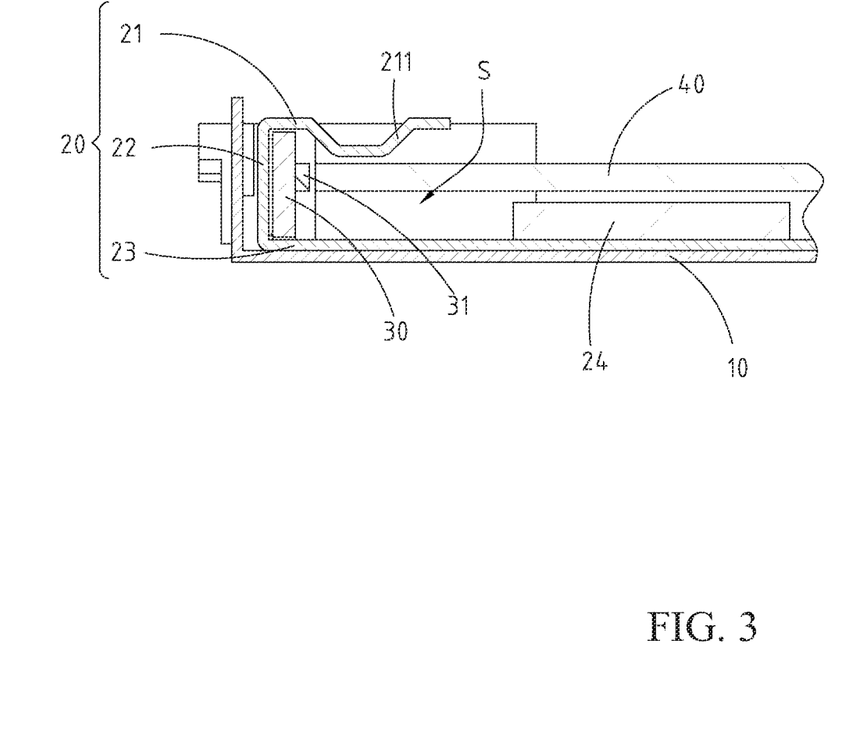
FIG. 3 is a sectional view along line A-A shown in FIG. 1.
Figure 4:
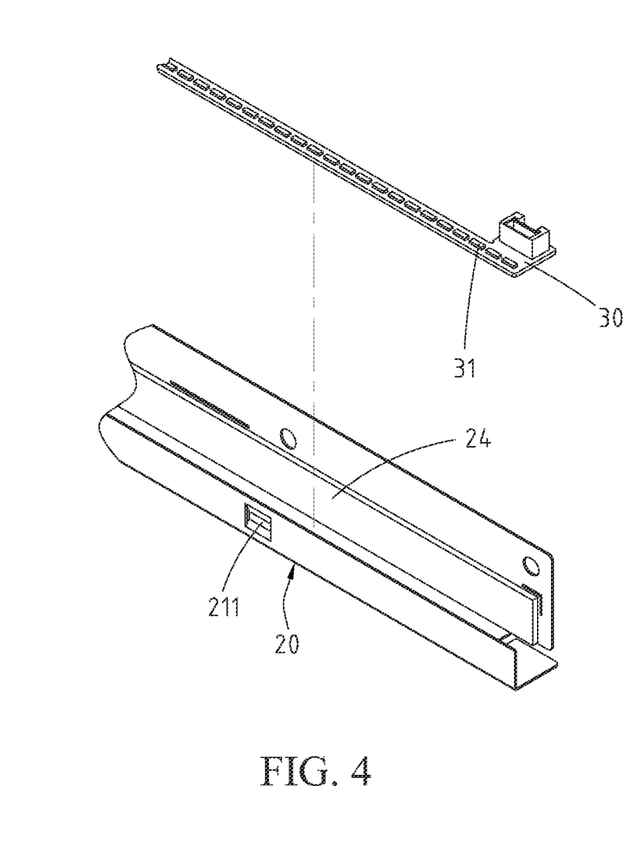
FIG. 4 is a partial enlarged view of a fastening module and a light source of the backlight component of the first embodiment according to the disclosure.

Please refer to FIG. 1, FIG. 2, FIG. 3 and FIG. 4, in which a backlight component of a first embodiment is illustrated; FIG. 1 is a perspective view of the backlight component of the first embodiment, FIG. 2 is an exploded view of the backlight component, FIG. 3 is a sectional view of the backlight component, and FIG. 4 is a partial enlarged view of a fastening module 20 and a light source 30 of the backlight component. The backlight component includes a back plate 10, two fastening modules 20, a light source 30 and a light-guiding plate 40. The size of the back plate 10 is adjustable according to the size of the screen where the backlight component is applied to, and embodiments are not limited thereto. Please refer to FIG. 4, in which each of the fastening modules 20 includes a first plate 21, a second plate 22 and a third plate 23. The second plate 22 is perpendicularly connected to the first plate 21. The third plate 23 is perpendicularly connected to the second plate 22 and parallel to the first plate 21.

As shown in FIG. 2, in which the two fastening modules 20 are fastened to two opposite sides of the back plate 10, places where the two fastening modules 20 are assembled to are determined based on the direction where the light source 30 is provided from; namely, the two fastening modules 20 are assembled to the top and bottom parts of the back plate 10, or are assembled to the right and left parts of the back plate 10. In this embodiment, a plurality of locking members 50 is provided for passing through the back plate 10 and then the third plate 23 from the back of the back plate 10, so that the third plate 23 is locked with the back plate 10. In this embodiment, the first plate 21, the second plate 22 and the third plate 23 are formed integrally as a whole; that is, only a single member is required to be manufactured to accomplish the aforementioned structure during the manufacturing process, thus the manufacturing time is reduced. Additionally, upon assembling, only a single member is required to be assembled to finish the assembling of the fastening module 20; in other words, it is not necessary for the user to combine, connect or secure the first plate 21 with the second plate 22 and the third plate 23, thereby the fabrication procedures and the manufacturing time are reduced.

The height of the second plate 22 is adjustable based on the illumination intensity of the light source 30 or the thickness of the light-guiding plate 40. The length of the third plate 23 can be equal to or longer than that of the first plate 21. In addition to fastening the fastening module 20 with the back plate, the third plate 23 is also provided for heat dissipation. As a result, the third plate 23 can be extended to increase the surface area of the third plate 23, thereby increasing the heat dissipation area of the third plate 23. In order to provide a sufficient heat-dissipation performance, the material of the first plate 21, the second plate 22 and the third plate 23 is selected from a group consisting of metal, ceramic, high strength plastic and combinations thereof. Additionally, in this embodiment, the fastening module 20 further includes a heat dissipation glue 24, for example, a hysol glue. The heat dissipation glue 24 is made by materials which dissipate heat sufficiently. The heat dissipation glue 24 is adhered to the third plate 23, so that the heat dissipation performance of the fastening module 20 is further enhanced.

As shown in FIG. 3, the first plate 21, the second plate 22 and the third plate 23 define a receiving space S; the light source 30 is securely assembled at one side of the second plate 22 and facing toward the receiving space S. In this instance, the light source 30 is a light bar including a plurality of light emitting diodes 31, and is securely adhered to the second plate 22 via adhesives. The light-guiding plate 40 is slidably assembled in the receiving space S of the fastening module 20, and sandwiched between the first plate 21 and the third plate 23. During assembling, the surface of the light source 30 from where the light is emitted faces toward the light-guiding plate 40, so that the light emitted from the light source 30 is directed to the light-guiding plate 40 to be distributed uniformly over the whole screen.

Please refer to FIG. 3 and FIG. 4, in which the first plate 21 includes a plurality of protruding portions 211 facing toward the receiving space S. When the light-guiding plate 40 is slid to the receiving space S, the protruding portions 211 are abutted against the upper surface of the light-guiding plate 40 (as shown in FIG. 3). With the protruding portions 211, the fastening of the light-guiding plate 40 is further improved.

Upon suffering a long-term illumination by the light source 30, the deformation extent of the light-guiding plate 40 caused by heat expansion is reduced due to the fastening of the protruding portions 211.

Based on the above, the light-guiding plate 40 can be secured by using the fastening module 20 only; the fastening module 20 is integrally formed as a whole thus being in convenience of manufacturing. Additionally, when the thickness of the light-guiding plate 40 is changed, only the second plate 22 of the fastening module 20 must be changed. Furthermore, in some instances, only the protruding extent of the protruding portions 211 is adjusted, so that the protruding portion 211s are pressed on the light-guiding plate 40, thereby the light-guiding plate 40 is securely sandwiched between the first plate 21 and the third plate 23. Additionally, when the size of the screen is altered, the same fastening module 20 is applicable, or a plurality of fastening modules 20 is applicable. Therefore, the manufacturing cost of display device can be reduced, and the fastening module 20 of the disclosure is applicable for different kinds of display devices.

Figure 5:
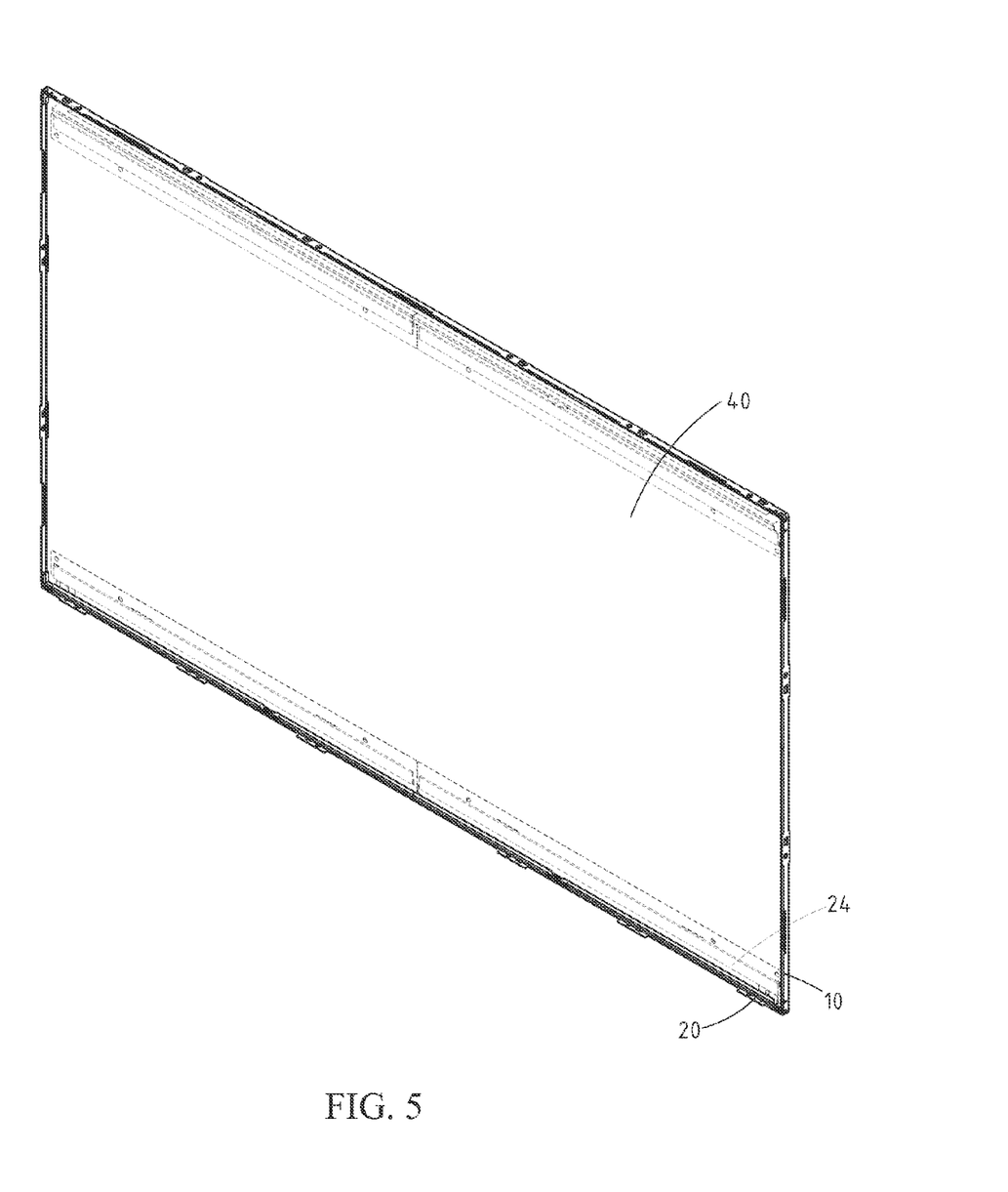
FIG. 5 is a perspective view of a backlight component of a second embodiment according to the disclosure.
Figure 6:
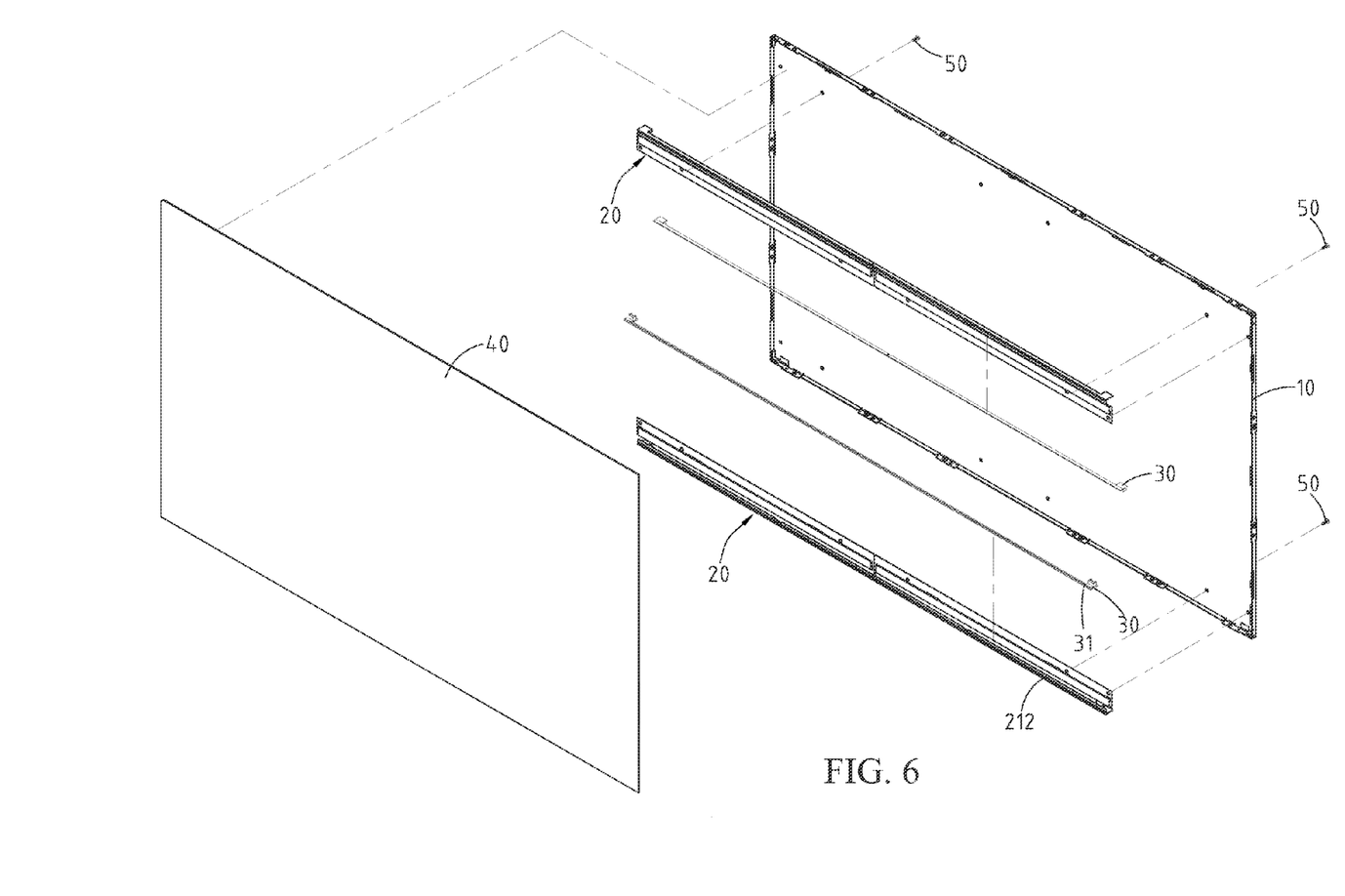
FIG. 6 is an exploded view of the backlight component of the second embodiment according to the disclosure.
Figure 7:
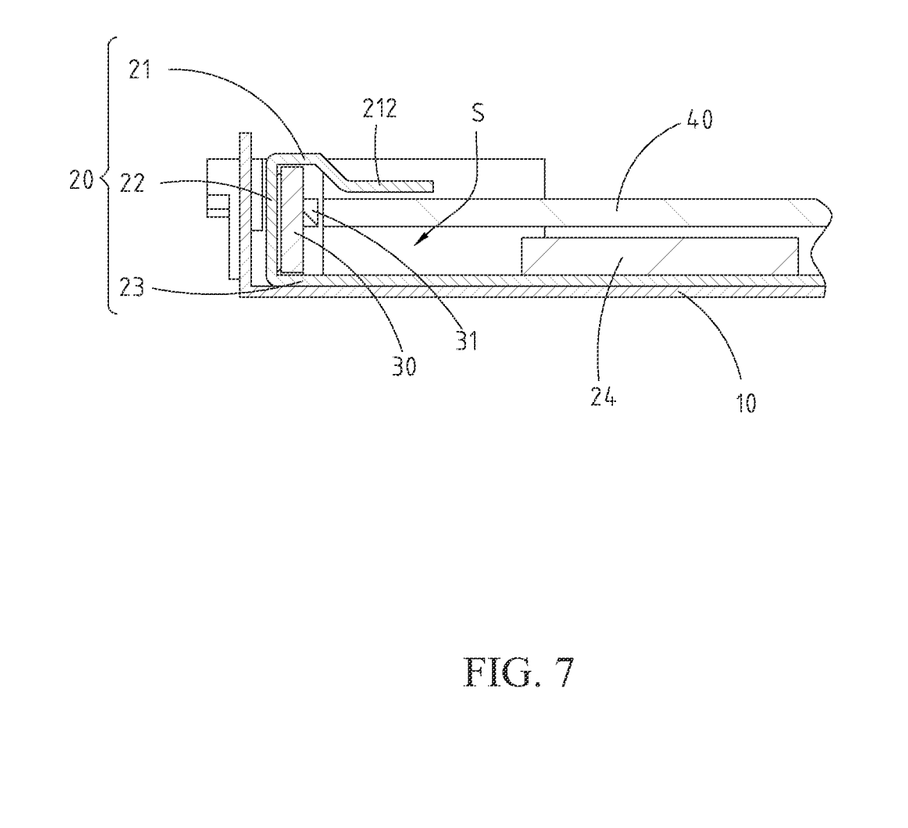
FIG. 7 is a sectional view of the backlight component of the second embodiment according to the disclosure.
Figure 8:
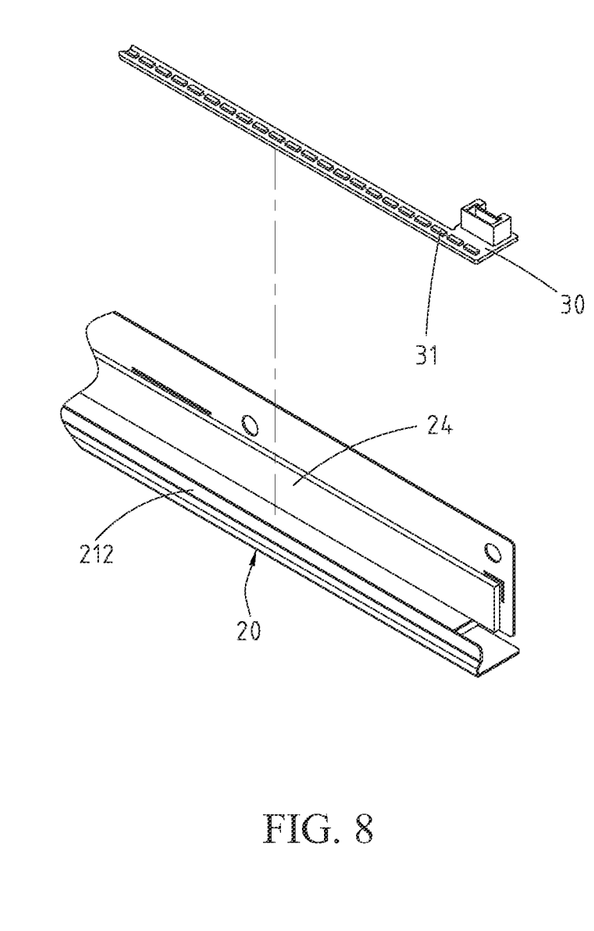
FIG. 8 is a partial enlarged view of a fastening module and a light source of the backlight component of the second embodiment according to the disclosure.

Please refer to FIG. 5 to FIG. 8, in which a backlight component of a second embodiment is illustrated; FIG. 5 is a perspective view of the backlight component of the second embodiment, FIG. 6 is an exploded view of the backlight component of the second embodiment, FIG. 7 is a sectional view of the backlight component of the second embodiment, and FIG. 8 is a partial enlarged view of a fastening module 20 and a light source 30 of the backlight component of the second embodiment. The structure of the second embodiment is approximately the same as that of the first embodiment, except that in the second embodiment, the size of the back plate 10 is rather larger, and four fastening modules 20 are assembled on the back plate 10.

Additionally, please refer to FIG. 6 to FIG. 8, in which embodiment, instead of using plural of protruding portions 211, a fastening portion 212 is assembled on the first plate 21.

The fastening portion 212 faces toward the receiving space S and is extended toward the two sides of the first plate 21 in which the two sides of the first plate 21 are perpendicular to the second plate 22. Similarly, the fastening portion 212 is abutted against the light-guiding plate 40; additionally, the fastening portion 212 is extended from the first plate 21, so that the side of the light-guiding plate 40 is pressed by the fastening portion 212.

Compared with the first embodiment, in this instance, when fastening to a light-guiding plate 40 with a larger area, the structure of the fastening portion 212 allows the first plate 21 to press on the periphery of the light-guiding plate 40, so that the light-guiding plate 40 is securely sandwiched by the first plate 21 and the third plate 23; therefore, the position of the light-guiding plate 40 is still fixed when the screen is moving or rotating. Additionally, with the long-term illumination of the light source 30, the deformation of the light-guiding plate 40 caused by heat expansion is retarded by the fastening portion 212, so light-leak issues can be prevented.

Figure 9:
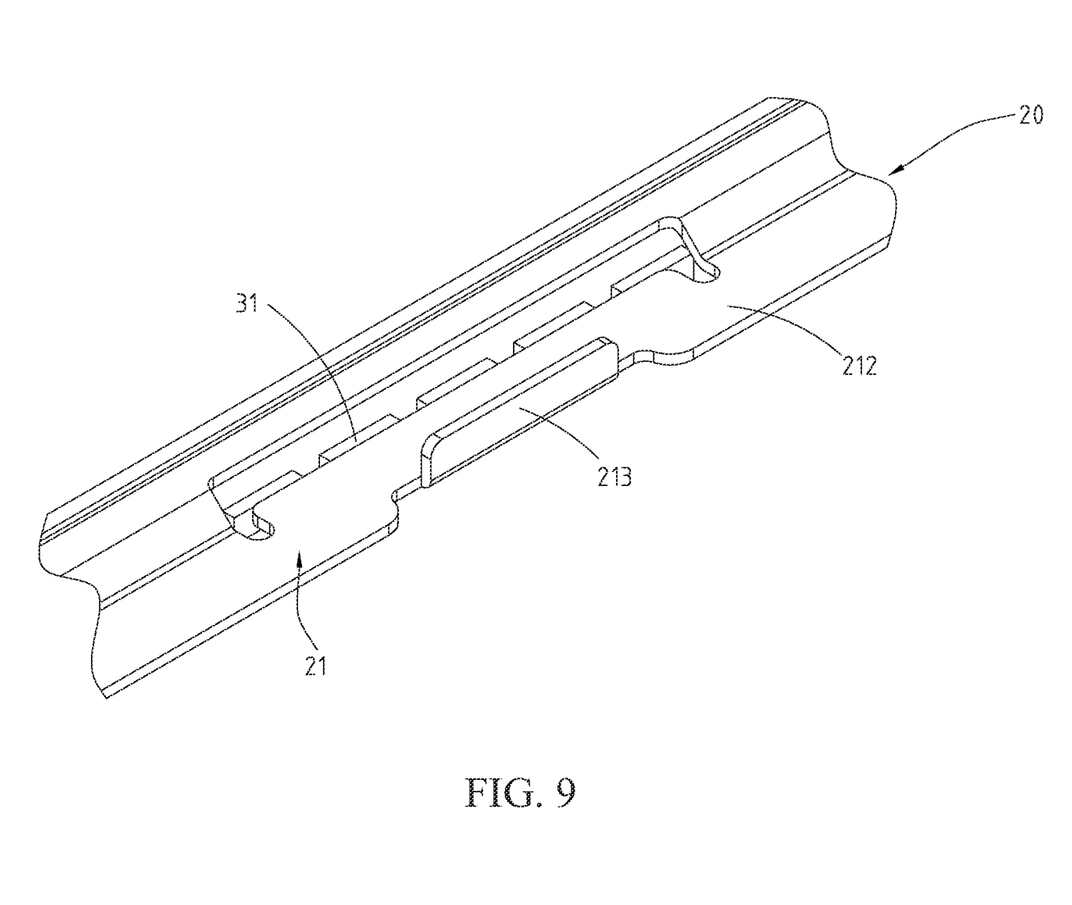
FIG. 9 is a partial enlarged view of a fastening module of a backlight component of a third embodiment according to the disclosure.
Figure 10:
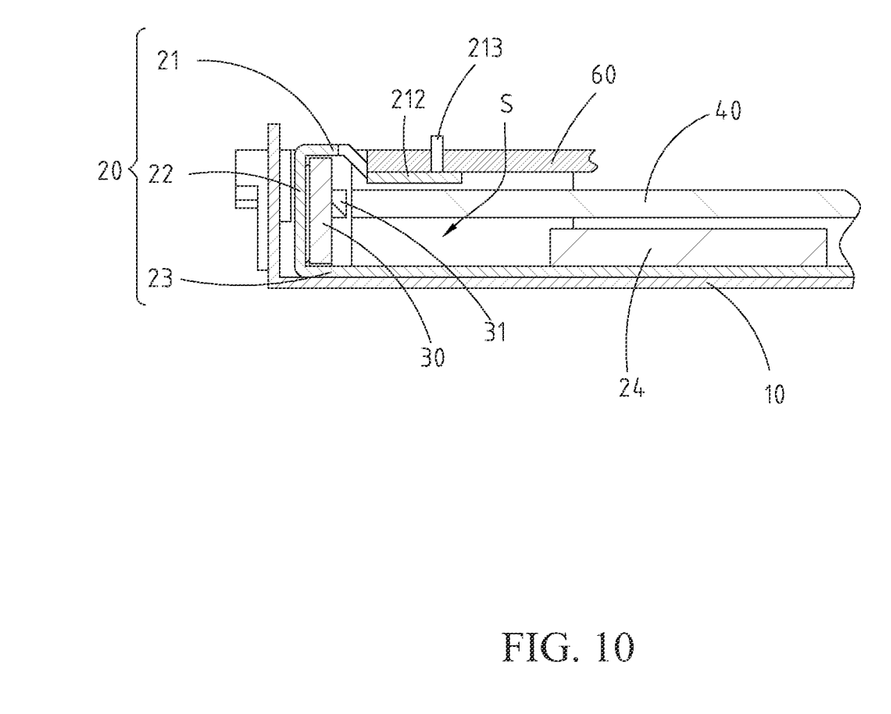
FIG. 10 is a sectional view of the backlight component of the third embodiment according to the disclosure.

Please refer to FIG. 9 and FIG. 10; in which a backlight component of a third embodiment is illustrated; FIG. 9 is a partial enlarged view of a fastening module 20 of the backlight component of the third embodiment, and FIG. 10 is a sectional view of the backlight component of the third embodiment. The structure of the third embodiment is approximately the same as that of the second embodiment, except that in the third embodiment, the first plate 21 includes a reflexed portion 213 extending toward a direction far from the third plate 23. Based on this, a film 60 of the display device is fastened on the reflexed portion 213 (conventional, the back plate 10 needs to add a hanger to secure the film 60). Here, the reflexed portion 213 is extended from the fastening portion 212 of the first plate 21 of the backlight component of the second embodiment, but embodiments are not limited thereto; in some instances of the first embodiment, the first plate 21 includes the reflexed portion 213.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A backlight component, comprising:
    a back plate;
    at least one fastening module, the fastening module fastened to the back plate, and the fastening module comprising:
        a first plate, comprising a reflexed portion;
        a second plate; perpendicularly connected to the first plate; and
        a third plate, perpendicularly connected to the second plate and parallel to the first plate, the reflexed portion is extended toward a direction away from the third plate and the first plate, the second plate and the third plate defining a receiving space;
    a light source, securely assembled at one side of the second plate and facing toward the receiving space; and
    a light-guiding plate, slidably assembled in the receiving space of the fastening module, and the light-guiding plate being sandwiched between the first plate and the third plate.

2. The backlight component according claim 1, wherein the first plate comprises a plurality of protruding portions facing toward the receiving space and abutting against the light-guiding plate.

3. The backlight component according to claim 1, wherein the first plate comprises a fastening portion facing toward the receiving space and extended toward two sides of the first plate in which the two sides of the first plate are perpendicular to the second plate.

4. The backlight component according to claim 1, wherein the first plate, the second plate and the third plate are formed integrally as a whole.

5. The backlight component according to claim 1, further comprising at least one locking member passing through the third plate and locked with the back plate, so that the fastening module is securely assembled with the back plate.

6. The backlight component according to claim 1, wherein the fastening module further comprises a heat dissipation glue adhered on the third plate.

7. The backlight component according to claim 1, wherein the fastening module is fabricated from a material selected from a group consisting of metal, ceramic, high strength plastic and combinations thereof.

* * * * *